United States Patent

Chatufale

[11] Patent Number: 6,041,804
[45] Date of Patent: Mar. 28, 2000

[54] SUBSEA VALVE ACTUATOR AND METHOD

[76] Inventor: Vijay R. Chatufale, 10950 W. Brae Pkwy. #2112, Houston, Tex. 77031

[21] Appl. No.: 09/027,527

[22] Filed: Feb. 23, 1998

[51] Int. Cl.$^7$ .......................... F16K 43/00; F16K 31/122
[52] U.S. Cl. ................................. 137/15; 92/13; 92/13.6; 92/130 R; 92/130 C; 137/315; 251/63.5; 251/63.6
[58] Field of Search .......................... 251/62, 63.5, 63.6, 251/60, 285; 92/130 C, 130 R, 13, 13.6; 137/315

[56] References Cited

U.S. PATENT DOCUMENTS

| | | | |
|---|---|---|---|
| Re. 30,115 | 10/1979 | Herd et al. | 251/63.6 |
| 3,086,745 | 4/1963 | Natho | 251/62 |
| 3,379,405 | 4/1968 | Natho | 251/63.6 |
| 3,466,001 | 9/1969 | Nelson | 251/63.6 |
| 3,572,032 | 3/1971 | Terry | 60/398 |
| 3,913,883 | 10/1975 | Irwin | 251/63.6 |
| 4,213,480 | 7/1980 | Orum et al. | 137/556 |
| 4,423,748 | 1/1984 | Ellett | 251/63.6 |
| 4,445,424 | 5/1984 | Foster et al. | 251/63.6 |
| 4,649,704 | 3/1987 | Marsh | 60/415 |
| 4,650,151 | 3/1987 | McIntyre | 251/63.5 |
| 4,744,386 | 5/1988 | Frazer | 137/315 |
| 4,809,733 | 3/1989 | Hawkins | 251/63.5 |
| 4,836,243 | 6/1989 | Ferrell | 251/63.6 |
| 4,967,785 | 11/1990 | Young | 251/63.6 |

OTHER PUBLICATIONS

Cameron Advertisement p. 1739 from *Composite Catalog of Oil Field Equipment and Services*, published by World Oil, Gulf Publishing Co., P.O. Box 2608 Houston, TX.

National Oilwell, p 2247 from *Composite Catalog of Oil Field Equipment and Services*, published by World Oil, Gulf Publishing Company, P.O. Box 2608 Houston, TX 77001.

FMC Advertisement, p 1185 from *Composite Catalog of Oil Field Equipment and Services*, published by World Oil, Gulf Publishing Co, P.O. Box 2608 Houston, TX.

WOM Advertisement p. 3148 from *Composite Catalog of Oil Field Equipment and Services*, published by World Oil, Gulf Publishing Co., P.O. Box 2608 Houston, TX.

Cooper Advert., 1994, from *Composite Catalog of Oil Field Equipment and Services*, published by World Oil, Gulf Publishing Company, P.O. Box 2608 Houston, TX 77001.

"Deepwater Failsafe SSV", *Offshore World Trends and Technology for Offshore Oil and Gas Operations*, A PennWell Publication, Mar. 1997.

*Primary Examiner*—George L. Walton
*Attorney, Agent, or Firm*—Kenneth L. Nash

[57] ABSTRACT

A subsea actuator and method is disclosed that includes a removable monolithic cap/hydraulic chamber that seals the actuator housing top with seals placed around the monolithic cap, defines a straight hydraulic line and port for control line hydraulic fluid, and provides for fasteners to secure the top of the subsea actuator. The monolithic cap/hydraulic chamber is so limited in metal and machine time that it can be a throw-away maintenance item. A preferably cup-shaped spring lifter is provided in telescoping relationship to the hydraulic chamber. Several short hydraulic fluid passageways are provided in the bottom cup portion of the spring lifter to permit assist hydraulic control fluid into the hydraulic chamber below the piston. The driving stem provides a removable connection to the hydraulic piston from the top of the actuator housing and a quick disconnect permits disconnection of the driving stem from the valve stem. The high tension spring does not need to be removed to perform maintenance, and all wear items and seals are readily accessible. Change or replacement of the stem packing is made from the top of the bonnet to avoid dissasembling the bonnet to valve body connection. The spring chamber within the actuator housing may be increased in size to accommodate a larger spring as necessary for fail-safe operation without changing the size of the hydraulic chamber. All sliding components ride on wear rings to increase the lifetime of reliable subsea operation. The moving components are mounted in a compact, concentric configuration.

20 Claims, 1 Drawing Sheet

SUBSEA VALVE ACTUATOR AND METHOD

BACKGROUND OF THE INVENTION

1. Field of the Invention

The present invention relates generally to subsea gate valve actuators and, more particularly, to apparatus and methods for a fail-safe hydraulic subsea actuator that reliably operates in deep water for extended time periods.

2. Description of the Background

Remote subsea fail-safe gate valves are typically controlled with hydraulic actuators. The hydraulic actuators and often their controls are located on the ocean floor. Although the location, configuration and types of actuators and controls vary, their operation is subjected to ambient sea pressure whether the actuator and controls are an open or closed system. The time required for a fail-safe valve to fail-safe close is critical, and therefore a short response time is highly desirable. As water depth increases, increased hydrostatic head, or ambient sea pressure, creates forces on the valves and actuators that due to a combination of conditions can unreasonably delay or preclude fail-safe operation upon loss of hydraulic control pressure. The valve size and internal valve line pressure can create additional problems under such conditions. As well, the hydraulic fluid volume and pressure may be limited due to typical system components that may include a hydraulic fluid accumulator and/or a hydrostatically pressurized subsea hydraulic fluid reservoir to avoid the need for multiple hydraulic lines to the surface. Furthermore, subsea actuators need to be very reliable because they operate in an environment that is not readily accessible. Conventional subsea actuators often have numerous problems that limit the operational range, reliability, cost, and maintenance thereof. While there are several commercially available subsea actuators on the market with different designs, the problems tend to be related.

In one commonly used design, the spring used for fail-safe operation is located within the hydraulic cylinder. While this arrangement may afford sufficient spring strength for actuation to depths of 1000 feet or so, it results in numerous problems for deep water subsea actuators. In this design, the spring outer diameter is limited to the size of the hydraulic cylinder. It is generally not desirable to increase the size of the hydraulic cylinder to provide a more powerful spring because this also increases the amount of hydraulic fluid necessary for operation and may present a potential problem at significant water depths. With a limited spring size, the fail-safe operation that the spring may afford is limited because the spring size is quite limited. Furthermore, positioning of the spring within the hydraulic cylinder also has the disadvantage of increasing the likelihood of ruining the sealing surfaces of the hydraulic cylinder due to contact with the spring during operation and also during assembly or disassembly. The damage requires replacement or reworking of the entire actuator housing and is therefore quite expensive. In this design, maintenance of even a single seal necessarily requires removal of the spring, which is normally under very high spring pressure, and may be a somewhat dangerous operation without special equipment. Typically, the entire gate valve as well as the operator must be broken down when doing virtually any maintenance. Thus, even replacing a single seal is a time consuming, costly operation. Not only is extensive time required for maintenance, but parts including additional replacement seals of all stationary metal-to-metal seals are necessary even though such may have been operating fine without problem. Thus, commonly available actuators tend to have numerous limitations including highly limited operational abilities, reliability problems, and very high maintenance costs.

Consequently, there remains a need for a subsea valve actuator that offers dependable operation at significant water depths, reduced maintenance time, all for reduced levels of capital investment. Those skilled in the art have long sought and will appreciate the present invention which provides solutions to these and other problems.

SUMMARY OF THE INVENTION

The present invention is embodied in a design for a hydraulic subsea actuator and method for a gate valve that allows more reliable and improved operation with reduced maintenance costs. All sliding metal components move on wear rings so that metal-to-metal contact is eliminated and wear is quite low for long term reliable operation. Hydraulic line connections are highly simplified as compared to other designs where the spring is separately mounted with respect to the hydraulic cylinder. Actuator seals including piston seals and bonnet/stem seals are readily accessible without the need to remove the very high tension spring that is necessary for subsea operation. Thus, maintenance costs and time are greatly reduced. No specialized equipment is necessary. If desired, the spring may be easily designed to be more powerful without substantially increasing the size of the hydraulic cylinder as may be desirable for deep water operation with large gate valves. If the hydraulic cylinder needs replacement, there is no need to rework the entire housing as required for most actuators. In fact, the small hydraulic cylinder is effectively a low cost throw away item that is easily replaced.

The present invention provides a method of making a subsea gate valve actuator that comprises procedures including adapting an actuator housing to be removably securable to a gate valve bonnet. At least one hydraulic port is formed in the actuator housing for controlling actuator housing internal hydraulic pressure. The actuator housing is sealed to contain internal hydraulic pressure therein. A hydraulic cylinder is removably secured to an end portion of the actuator housing that is distal to the gate valve bonnet. A high tension spring is fitted externally with respect to the hydraulic cylinder such that the spring is preferably in surrounding relationship to the hydraulic cylinder so as to provide a compact design profile. A hydraulic piston is fitted with seals for both a positive and a negative pressure differential across the hydraulic piston. The hydraulic piston preferably has an outer diameter smaller than an inner diameter of the spring. A first hydraulic passageway is formed in one side of the hydraulic cylinder and a second hydraulic passageway is formed in a second side of the hydraulic cylinder such that the second side of the hydraulic cylinder is in communication with the actuator housing internal hydraulic pressure. A spring lifter is preferably mounted in telescoping relationship to the hydraulic cylinder. The spring lifter preferably defines at least a portion of the second hydraulic passageway therethrough for communicating the assist line hydraulic fluid from the actuator housing to the second side of the hydraulic cylinder. The spring lifter is compresses the high tension spring. The design preferably incorporates a drift adjustment to stop the spring lifter for controlling drift adjustment of the gate valve. The method preferably comprises forming an end cap of the actuator housing distal the bonnet to be a monolithic component of the hydraulic cylinder. The presently preferred embodiment of the present invention preferably utilizes a valve driving stem removably affixed to the hydraulic piston within the hydraulic cylinder for easy removal therefrom. The valve driving stem also includes a quick disconnect attachment to the valve stem so that the actuator housing is easily removed from the gate valve bonnet. A spring stop such as a snap ring is utilized on the end of the actuator housing adjacent to the valve stem to thereby hold the high energy spring in position when the actuator housing is removed from bonnet. Moreover, the stem seal is mounted in an outer portion of the bonnet to be readily accessible when the actuator housing is removed from the bonnet. A spring stop, preferably in the form of the spring lifter, is provided on the end of the actuator housing distal the valve stem to hold the spring in position when the piston and/or hydraulic cylinder is removed from the actuator housing. The spring lifter is preferably formed to be substantially cup-shaped and is telescopically moveable with respect to the hydraulic cylinder.

Thus, the invention preferably comprises an apparatus which is a subsea valve actuator for a gate valve with a bonnet and a valve stem. A hydraulic actuator housing defines at least one hydraulic housing port for assist line hydraulic fluid flow into the housing. Housing seals for the hydraulic actuator housing permit production of an internal actuator housing hydraulic pressure within the actuator housing. A hydraulic cylinder is positioned within the hydraulic actuator housing. The hydraulic cylinder defines a line port for receiving hydraulic control line fluid. In a presently preferred embodiment, the hydraulic cylinder is a monolithic component that also includes a cap for the actuator housing such that the cap includes the control line fluid port. The cap furthermore preferably includes bolt holes for fastening the cap to the actuator. A hydraulic piston is slidably mountable within the hydraulic cylinder so as to be operable for movement in a first direction in response to the hydraulic control line fluid and in a second direction in response to assist line hydraulic fluid. The spring lifter is mountable in surrounding relationship to the hydraulic cylinder; and an actuator spring is mountable for engagement with the spring lifter such that the actuator spring is in surrounding relationship to the hydraulic cylinder. The subsea valve actuator preferably includes a spring lifter that has a profile defining at least one hydraulic flow path for flow of the assist line hydraulic fluid into the hydraulic cylinder from the interior of the hydraulic actuator housing. The spring lifter is preferably telescopically connected to the hydraulic cylinder. The drift adjustment member is preferably in surrounding relationship with respect to the valve stem.

It is an object of the present invention to provide an improved subsea hydraulic actuator and method.

It is another object of the present invention to provide a subsea actuator with a convenient configuration that can be readily modified to provide a low profile with substantial spring strength arranged so that the spring cannot damage hydraulic surfaces during manufacture, assembly, or operation.

It is yet another object of the present invention to provide a subsea hydraulic actuator with a convenient flow path for assist line hydraulic fluid through the actuator housing into the hydraulic cylinder.

A feature of the present invention is a telescoping spring lifter having passageways therethrough for assist line hydraulic fluid to flow into the hydraulic cylinder.

Another feature of the present invention is a hydraulic piston that is removably secured to a driving stem to allow assist line hydraulic power to close the valve, if desired.

Another feature of the present invention is a monolithic cap and hydraulic cylinder with built-in hydraulic line, seals for sealing the top of the actuator housing, and fastener connections, all in one piece.

An advantage of the present invention is greatly reduced maintenance time and cost.

Another advantage of the present invention is high performance, high reliability, with little wear.

Yet another advantage of the present invention is that change or replacement of the stem packing is performed from the top of the bonnet to avoid the need for dissassembling the bonnet to valve body connection.

These and other objects, features, and advantages of the present invention will become apparent from the drawings, the descriptions given herein, and the appended claims.

Figure 1:
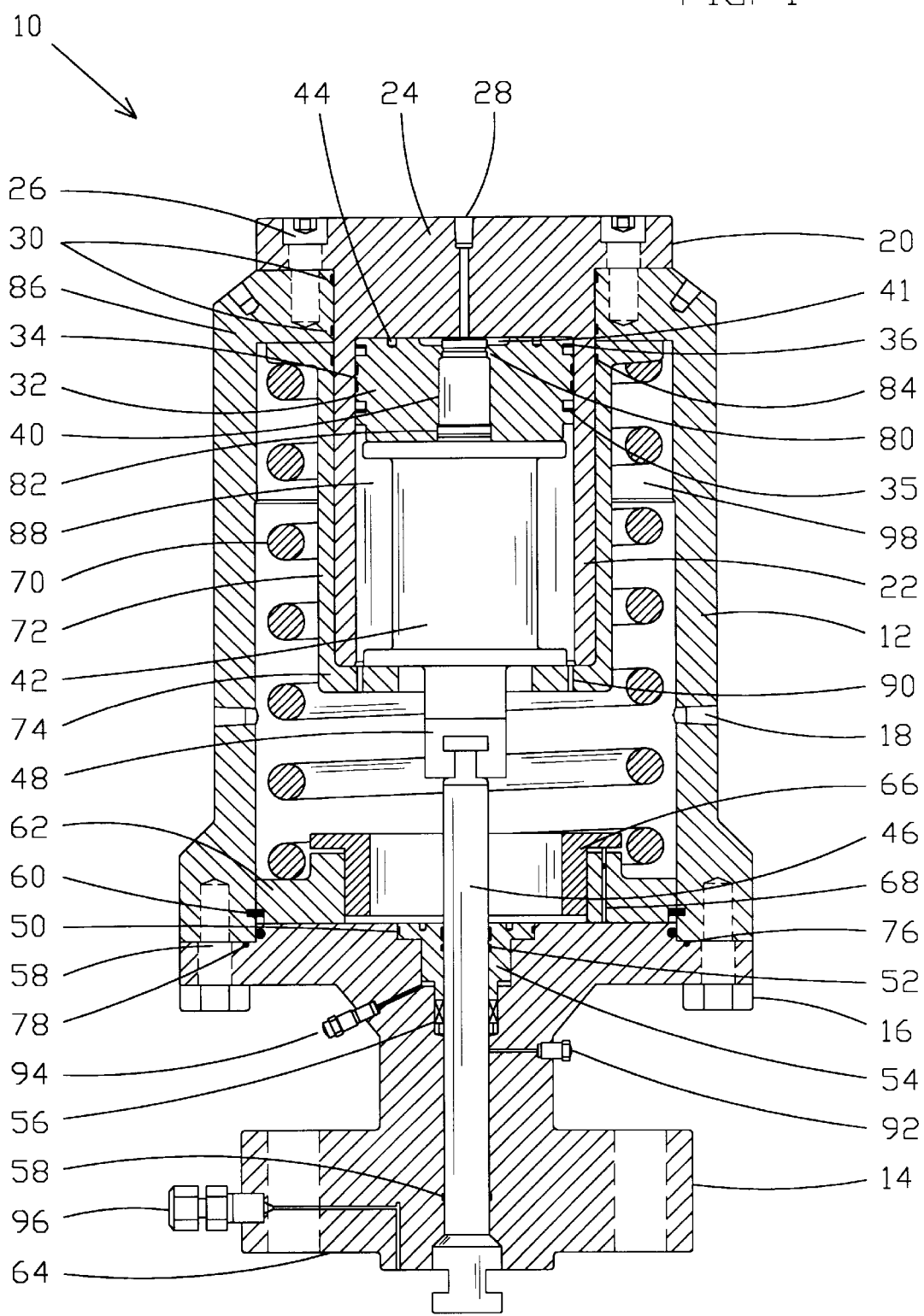
FIG. 1 is an elevational view, partially in section, of a subsea hydraulic actuator assembly in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

BRIEF DESCRIPTION OF THE PREFERRED EMBODIMENTS

Referring now to the drawings, and more particularly to FIG. 1, the generally preferred configuration of subsea actuator 10, in accord with the present invention, is illustrated.

FIG. 1 shows actuator housing 12 removably connected to gate valve bonnet 14 preferably be means of bolts such as hex head bolt 16 although other removable fasteners, such as various types of bolts or clamps could also be used. Hydraulic ports 18, which may be ½ inch NPT ports preferably including at least two such ports 180° apart, may are formed in actuator housing 12. Other numbers and spacings or sizes of hydraulic ports could be used as desired to provide connections for the assist line hydraulic control that is used in subsea systems for compensation of the subsea environment hydrostatic head. The unique means of the present invention for connecting assist line hydraulic fluid to an internally positioned hydraulic cylinder 20 is discussed hereinafter.

Hydraulic cylinder 20 includes and is preferably monolithically formed along with cap portion 24. Therefore, cap portion 24 stoutly and solidly supports cylinder portion 22 within actuator housing 12. Because cylinder portion 22 is part of the cap portion 24 of the actuator housing and because cylinder 22 has an open-ended design, hydraulic cylinder 20 is easily and quickly removable from actuator housing 12. Removal of hydraulic cylinder 20 simply requires removing screws 26 that preferably include a plurality of socket head screws, or other fasteners or clamps as desired. Cap portion 24 also preferably includes the holes for screws 26. Furthermore, hydraulic control port and line 28 is also conveniently drilled into cap portion 24. This very convenient design eliminates the need for separate hydraulic lines inside the actuator which complicate assembly and disassembly, and reduce reliability, in some actuators. Hydraulic control port and line 28 provides the connection to the external hydraulic control line (not shown) used to operate, either open or close, the gate valve. A fail-safe valve may either automatically close or open upon failure of the hydraulic system, depending on the valve design. A typical operating pressure of subsea control systems is in the range of about 3000 p.s.i. working pressure above the hydrostatic head pressure. Hydraulic port and line 28 is very simply made by drilling a straight hole in cap portion 24 and preferably tapping the hole to produce a threaded connection. This type of machining is low cost and is just as effective as some of the more complicated hydraulic porting used in other actuator designs. Thus, the hydraulic cylinder and cap is preferably made so that it can be a low cost throw away item that is easily stored thereby greatly reducing repair time, shipping costs, machine costs, etc. Hydraulic cylinder 20 preferably is also conveniently used to seal the top portion of actuator housing 12 with seals 30 around cap portion 24 that inserts handily into the top portion of actuator housing 12. Seals 30 may preferably be designed for sealing in a particular direction so that the upper seal 30 seals hydrostatic sea pressure and lower seal 30 seals assist line hydraulic fluid which may be at hydrostatic pressure when the actuator is stationary depending on the design of the subsea hydraulic activation system. Thus, hydraulic cylinder 20 is preferably a very handy, compact, one-piece monolithic design that performs many useful functions for subsea actuator 10 including those functions discussed above.

Hydraulic piston 32 slidably moves within hydraulic cylinder 20 and is preferably mounted on wear ring 34 to avoid metal-to-metal contact. In fact, all sliding components are mounted on wear rings and are slightly undercut with respect to the wear rings so that metal-to-metal contact is avoided. Thus, actuator 10 is quality made for very long term, reliable service. Lower piston seal 35 provides a seal for pressure acting on piston 32 due to assist line hydraulic force. Upper piston seal 36 provides a seal for pressure acting on piston 32 due to control line hydraulic force.

Removably secured to hydraulic piston 32 by threads 40 and retainer ring 41 is driving stem 42. Driving stem 42 adds considerable maintenance and assembly flexibility to subsea actuator 10 by allowing as easy disconnection from either hydraulic piston 32 or valve stem 46 without ever having to remove high tension spring 70. Once hydraulic cylinder 20 is removed after simply unscrewing the plurality of screws 26, then hydraulic piston 32 can be easily removed by disconnecting it from driving stem 42, i.e., removing retainer ring 41 and threadably rotating hydraulic piston 32 which rotation can be easily accomplished using removal grip holes 44 in the top of the piston. If maintenance is to be on a seal adjacent bonnet 14 and it is desired to leave hydraulic cylinder 20 in place, then bolts 16 are removed and quick disconnect 48 allows removal of substantially the entire subsea actuator 10 from bonnet 14. This may be desirable when replacing the various stem seal elements including stem seal 52, packing gland 54, packing gland seal 50, or packing assembly 56. It will be noted that upper and lower wear rings 58 are provided along valve stem 46 so that metal-to-metal contact wear does not occur when valve stem 46 is operated. As noted above, the metal components such as the stem or other components with wear rings are preferably undercut slightly so that only the wear rings make contact. The above valve stem seal elements are preferably available without removing bonnet 14. This design saves a great deal of time and avoids removing the plurality of seals, including metal seals, therein that must be replaced each time the valve bonnet is opened, e.g. seal 64. This feature saves considerable maintenance costs. In many actuator/gate valve designs, the stem seal elements are beneath the bonnet thereby necessitating considerably more maintenance time/cost for replacement. One significant advantage of the present invention is that spring 70, which is under very high stress and is quite dangerous to remove, never has to be even considered or seen in servicing from the top or bottom of subsea actuator 10. Retainer ring 60 affixes spring base guide assembly 62 in position to retain the spring at the bottom of actuator housing 12 thereby eliminating the need to disassemble the spring assembly for virtually any maintenance requirement. The easy maintenance design of the present invention also makes bottom actuator housing seals 76 and 78 available for servicing without concern about spring 70. Seal 76 is preferably designed to seal hydraulic fluid at varying pressures while seal 78 may preferably seal seawater at hydrostatic pressure. Access is also provided to drift adjustment mechanism 66.

Drift adjustment 66 is preferably threadably adjustable to eliminate any drift variations. Once the drift adjustment is set, typically by using a drift gauge that is designed for the valve, then several lock screws, such as lock screw 68 may be used to affix the position of drift adjustment 66. Drift adjustment mechanism 66 operates by providing a stop to limit the stroke length of subsea actuator 10 as the spring 70 is compressed along with spring lifter 72 until spring lifter cup bottom 74 abuts drift mechanism 66.

Therefore, driving stem 42 is another highly convenient element of the design of subsea actuator 10. Driving stem 42 is utilized as discussed above to permit easy access to virtually all maintenance items without the need for removing high tension spring 70. Driving stem 42 includes an upper seal 80, preferably with a back-up ring, for sealing hydraulic control pressure and a lower seal 82, preferably with a back-up ring, for sealing assist hydraulic pressure.

Spring lifter 72 provides several useful functions. For instance, the cup shape of spring lifter 72 surrounds and also provides even more physical support for hydraulic cylinder 20 at end 22. Spring lifter 72 utilizes one or more wear rings, such as wear ring 84 upon which spring lifter is telescopically movable with respect to hydraulic cylinder 20 at end portion 22. Spring lifter 72 includes a massive lip section 86 to easily support even very high tension springs such as subsea tension spring 70. Subsea tension spring, in the present design, is about six times as strong as the same spring might be in a surface actuator. This provides high speed fail safe closing as is desirable. It will be noted that in the present design, actuator internal spring housing 98 can be easily expanded radially outwardly to accommodate an even larger spring, if desired, without the need to make any change in the volume of hydraulic cylinder chamber 88. Thus, the present invention design is extremely flexible without requiring hydraulic control fluid volume changes. Hydraulic control systems operating volume may be quite limited in subsea applications because they often require an accumulator and/or hydrostatically pressurized fluid reservoir with limited hydraulic volume flow output. Another feature of spring lifter 72, that is quite low cost and simple but very effective, is the porting 90 by which assist hydraulic fluid enters hydraulic chamber 88. In many actuators, extension channels or tubing is used which can be quite costly to drill and may be more subject to damage or improper installation. Ports 90 within spring lifter cup bottom 74, which may include a plurality of ports are very simple and low cost to make but are quite effective as the more extensive channeling and/or tubing found in other designs. Since the entire spring lifter is moveable in the present design, the use of hydraulic lines would not have been as reliable as the present design which is very simple, and yet very reliable. A review of some other actuators that have a hydraulic cylinder separate from the spring chamber, which feature has many advantages, reveals problems in this area that are quite simply overcome in the present design.

Bleeder plug 92 is readily accessible to bleed off pressure within bonnet 14 and below stem seal 52. Relief valve 94 can vent pressure that may develop around packing gland 54. Grease fitting 96 may be used as desired to inject grease or other sealing fluid into bonnet 14 of the gate valve.

In operation, hydraulic fluid enters control port 28 to pressurize hydraulic piston 32 to move downwardly. It will be noted that directions are used only for convenience of understanding with respect to FIG. 1 and that the actuators may be oriented in various ways which will not affect reliable operation of the present invention so that such directions as used are not intended to be limiting in any way. As hydraulic piston 32 moves downward, it also moves driving stem 42 downwardly that contacts spring lifter cup bottom 74 and there moves spring lifter 72 downwardly so compressing spring 70 by means of spring lifter flange or lip 86. Hydraulic fluid is exhausted from cylinder 88 through ports 90 and from actuator housing hydraulic assist ports 18. The stroke is stopped and the gate valve is precisely open when spring lifter cup bottom 74 contacts drift adjustment 66. Various hydraulic controls may be used to provide assist hydraulic fluid pressure to close the valve in the opposite manner. For fail-safe operation in one system for instance, control hydraulic fluid and assist hydraulic fluid lines are coupled together through a hydraulic control that is biased to move to a fail-safe position upon failure that connects both lines to a hydrostatically pressurized hydraulic fluid reservoir (not shown).

High tension spring 70 operates to quickly close the valve by pressing upwardly against lip 86 to thereby move driving stem 42 and hydraulic piston 32 upwardly, to close the valve. Because all hydraulically controlled elements are sealed both upwardly and downwardly for both control pressure and assist pressure operation, the design of the present invention can operate with any available hydraulic control configuration.

The foregoing disclosure and description of the invention is illustrative and explanatory thereof, and it will be appreciated by those skilled in the art, that various changes in the size, shape and materials as well as in the details of the illustrated construction or combinations of features of the various coring elements may be made without departing from the spirit of the invention.

What is claimed is:

1. A method of assembling a subsea gate valve actuator for operating a gate valve with a bonnet and a valve stem, said valve stem being operable for moving a gate of said gate valve between a first rate position and a second gate position for controlling flow through said gate valve, said method comprising:

adapting an actuator housing to be removably securable to said bonnet;

providing at least one hydraulic port in said actuator housing for controlling actuator housing internal hydraulic pressure;

sealing said actuator housing for containing internal hydraulic pressure within said actuator housing;

removably securing a hydraulic cylinder having a cylindrical portion to an end portion of said actuator housing, said end portion being distal with respect to said bonnet;

providing a spring external to said hydraulic cylinder such that said spring is in surrounding relationship to said hydraulic cylinder, a first end of said spring being secured with respect to said actuator housing;

sealing a hydraulic piston for use in said cylindrical portion of said hydraulic cylinder, said hydraulic piston having a first side and a second side, said hydraulic piston being moveable between a first piston position and a second piston position, said hydraulic piston being operatively connected to said valve stem for moving said gate between said first gate position and said second gate position, said hydraulic piston being provided with an outer diameter less than an inner diameter of said spring;

providing a first hydraulic passageway to a first side of said hydraulic cylinder for applying a first pressure to said first side of said hydraulic piston that when sufficient moves said hydraulic piston to said first piston position so as to move said gate to said first gate position; and providing a second hydraulic passageway to a second side of said hydraulic cylinder for applying a second pressure to said second side of said hydraulic piston that when sufficient moves said hydraulic piston to said second piston position so as to move said gate to said second gate position, said second side of said hydraulic cylinder being in communication with said actuator housing internal hydraulic pressure; and providing a spring lifter in telescoping relationship to said hydraulic cylinder such that at least a portion of said second passageway is provided through said spring lifter for communicating said actuator housing internal hydraulic pressure to said second side of said hydraulic cylinder to produce said second pressure at said second side of said hydraulic piston such that said second pressure is produced by said actuator housing internal pressure, said spring lifter being engaged with said spring at a second end of said spring.

2. The method of claim 1, further comprising:

providing a drift adjustment that is selectively adjustable in position with respect to said actuator housing, said spring lifter being axially moveable with respect to said actuator housing in response to movement of said hydraulic piston, said drift adjustment limiting movement of said spring lifter and said hydraulic position to provide a selective adjustment of a gate valve drill of said gate for at least one of said first gate position or said second gate position.

3. The method of claim 1, further comprising:

providing an end cap of said actuator housing distal said bonnet to be monolithic with said cylindrical portion of said hydraulic cylinder.

4. The method of claim 3, further comprising:

sealing around said end cap of said hydraulic cylinder to provide a top seal for said actuator housing.

5. The method of claim 1, further comprising:

removably securing a valve driving stem to said hydraulic piston within said hydraulic cylinder.

6. The method of claim 1, further comprising:

positioning said spring lifter for compressing said spring such that said hydraulic cylinder is removable from said hydraulic housing without need for removing said spring.

7. The method of claim 1, further comprising:

providing a spring stop on an end of said actuator housing adjacent to said valve stem to hold said spring in position when said actuator housing is removed from said bonnet, and mounting a stem seal on an outer portion of said bonnet such that it is accessible when said actuator housing is removed from said bonnet.

8. The method of claim 1, further comprising:

providing a spring stop on an end of said actuator housing distal said bonnet to hold said spring in position when said piston is removed from said actuator housing.

9. A method of assembling a subsea valve actuator for controlling a valve stem for use with a gate valve having a bonnet, said valve stem being operable for moving a gate of said gate valve between a first gate position and a second gate position for controlling flow through said gate valve, said method comprising:

adapting an actuator housing to be removably securable to said bonnet;

providing at least one hydraulic port into said actuator housing for controlling actuator housing internal hydraulic pressure;

sealing said actuator housing so as to control internal hydraulic pressure within said actuator housing;

providing a hydraulic cylinder having a cylindrical portion within said actuator housing;

providing a spring within said actuator housing;

positioning a spring lifter to be slidably moveable with respect to said hydraulic cylinder, said spring being positioned between said spring lifter and an interior of said actuator housing;

sealing a hydraulic piston for use in said cylindrical portion of said hydraulic cylinder, said hydraulic piston having a first side and a second side, said hydraulic piston being moveable between a first piston position and a second piston position, said hydraulic piston being operatively connected to said valve stem for moving said gate between said first gate position and said second gate position;

providing a first hydraulic passageway to said hydraulic cylinder for producing a first pressure on said first side of said hydraulic piston that when sufficient moves said hydraulic piston to said first position so as to move said gate to said first gate position;

providing a second hydraulic passageway to an opposite end of said hydraulic cylinder for producing a second pressure on said second side of said hydraulic piston that when sufficient moves said hydraulic piston to said second position so as to move said gate to said second gate position, said second pressure being produced by said actuator housing internal hydraulic pressure; and providing a drift adjustment that is selectively adjustable in position with respect to said actuator housing, said spring lifter being mountable for movement with respect to said actuator housing in response to movement of said hydraulic piston, said drift adjustment limiting movement of said spring lifter and said hydraulic piston to provide selective adjustment of a gate valve drift of said gate for at least one of said first or second gate positions.

10. The method of claim 9, further comprising:

forming at least a portion of said second hydraulic passageway through said spring lifter.

11. The method of claim 9, further comprising:

removably affixing a valve driving stem to said hydraulic piston within said hydraulic cylinder.

12. The method of claim 9, wherein said step of providing a hydraulic cylinder further comprises:

removably attaching said hydraulic cylinder to said actuator housing.

13. The method of claim 9, wherein said step of positioning a spring external to said hydraulic cylinder further comprises:

positioning said spring around said hydraulic cylinder.

14. The method of claim 9, wherein said step of providing a spring lifter further comprises:

forming an end cap of said actuator housing distal said bonnet to be monolithic with said cylindrical portion said hydraulic cylinder, and sealing around said end cap of said hydraulic cylinder to provide a top seal for said actuator housing.

15. A subsea valve actuator for a valve with a bonnet and a valve stem, said valve stem being operable for moving a control element of said valve between a first valve position and a second valve position for controlling flow through said valve, said actuator comprising:

a hydraulic actuator housing, said hydraulic actuator housing defining at least one hydraulic housing port to permit assist line hydraulic fluid into said housing;

housing seals for said hydraulic actuator housing to permit production of internal actuator housing hydraulic pressure within an interior of said hydraulic actuator housing;

a hydraulic cylinder within said hydraulic actuator housing, said hydraulic cylinder defining a line port for receiving hydraulic control line fluid;

a cap for said hydraulic actuator housing monolithically formed with a cylindrical portion of said hydraulic cylinder and at least one of said housing seals being fitted around a portion of said cap for sealing an upper portion of said actuator housing, said cap defining said line port;

a hydraulic piston slidably mountable within said hydraulic cylinder for movement between a first piston position and a second piston position, said hydraulic piston having a first side and a second side, said hydraulic piston being operably connectable to said valve stem for moving said control element of said valve between said first valve position and said second valve position, said hydraulic piston being moveable to said first piston position within said cylindrical portion in response to a sufficient first pressure produced on said first side of said hydraulic piston by said hydraulic control line fluid and in response to a sufficient second pressure produced on said second side of said hydraulic piston by said assist line hydraulic fluid;

a spring lifter mountable surroundingly to said hydraulic cylinder;

a spring mountable for engagement with said spring lifter at a first end of said spring and being supported within said hydraulic actuator housing at a second end of said spring; and said spring lifter containing at least one hydraulic flow path for flow of said assist line hydraulic fluid into said hydraulic cylinder from said interior of said hydraulic actuator housing.

16. The subsea valve actuator of claim 15, wherein:

said spring lifter is telescopically connected to said hydraulic cylinder.

17. The subsea valve actuator of claim 15, wherein:
said hydraulic cylinder is removably mountable within said hydraulic actuator housing.

18. The subsea valve actuator of claim 15, wherein:
said hydraulic cylinder is disposed in an end of said hydraulic actuator housing distal said bonnet.

19. The subsea valve actuator of claim 15, further comprising:

a drift adjustment member in surround relationship with respect to said valve stem.

20. The subsea valve actuator of claim 15, further comprising:

said spring lifter being telescopically mounted with respect to said hydraulic cylinder.

* * * * *